US010298539B2

(12) United States Patent
Akcin et al.

(10) Patent No.: US 10,298,539 B2
(45) Date of Patent: May 21, 2019

(54) PASSIVE DELEGATIONS AND RECORDS

(71) Applicant: Microsoft Technology Licensing, LLC, Redmond, WA (US)

(72) Inventors: Mehmet Akcin, Bothell, WA (US); Kresimir Bozic, Dublin (IE)

(73) Assignee: Microsoft Technology Licensing, LLC, Redmond, WA (US)

( * ) Notice: Subject to any disclaimer, the term of this patent is extended or adjusted under 35 U.S.C. 154(b) by 985 days.

(21) Appl. No.: 14/795,082

(22) Filed: Jul. 9, 2015

(65) Prior Publication Data

US 2017/0012930 A1    Jan. 12, 2017

(51) Int. Cl.
*H04L 29/12* (2006.01)
*H04L 29/06* (2006.01)
*H04L 29/14* (2006.01)

(52) U.S. Cl.
CPC ...... *H04L 61/1511* (2013.01); *H04L 61/2007* (2013.01); *H04L 63/1458* (2013.01); *H04L 69/40* (2013.01)

(58) Field of Classification Search
CPC . H04L 61/1511; H04L 63/1458; H04L 69/40; H04L 61/2007
See application file for complete search history.

(56) References Cited

U.S. PATENT DOCUMENTS

| | | | |
|---|---|---|---|
| 8,316,110 B1 | 11/2012 | Deshmukh et al. | |
| 8,499,336 B2 | 7/2013 | Alex et al. | |
| 8,621,556 B1 | 12/2013 | Bharali et al. | |
| 8,924,589 B2 | 12/2014 | Thiel et al. | |
| 2009/0024722 A1 | 1/2009 | Sethuraman et al. | |
| 2011/0299387 A1* | 12/2011 | Eydelman | H04L 41/069 370/225 |
| 2013/0080510 A1 | 3/2013 | Leftik et al. | |
| 2013/0268649 A1* | 10/2013 | Kinra | G06F 17/30864 709/224 |
| 2014/0089503 A1 | 3/2014 | Thyni et al. | |
| 2014/0129699 A1* | 5/2014 | Jeftovic | H04L 41/0668 709/224 |

(Continued)

OTHER PUBLICATIONS

"International Preliminary Report on Patentability Issued in PCT Application No. PCT/US2016/041415", dated May 31, 2017, 7 Pages.

(Continued)

*Primary Examiner* — Shean Tokuta
*Assistant Examiner* — Juan C Turriate Gastulo
(74) *Attorney, Agent, or Firm* — Liang IP, PLLC

(57) ABSTRACT

Various techniques for managing backup for domain nameservers are disclosed herein. In one embodiment, a method includes receiving a nameserver record associated with a domain name. The nameserver record containing addresses of an active nameserver and a passive nameserver. The method also includes determining if the active nameserver is reachable by contacting the active nameserver based on the address of the active nameserver in the nameserver record. In response to determining that (i) the active nameserver is unreachable and (ii) the nameserver record does not include an address of an additional active nameserver, the method includes contacting the passive nameserver for resolving the domain name based on the address of the passive nameserver in the nameserver record.

18 Claims, 11 Drawing Sheets

(56) References Cited

U.S. PATENT DOCUMENTS

2014/0229606 A1 8/2014 Griswold et al.

OTHER PUBLICATIONS

"Configuring Amazon Route 53 Active-Active and Active-Passive Failover", Published on: Jul. 2, 2014 Available at: http://docs.aws.amazon.com/Route53/latest/DeveloperGuide/dns-failover-configuring.html.
"Active-Passive Automated Failover", Retrieved on: May 20, 2015 Available at: https://nsone.uservoice.com/knowledgebase/articles/487005-active-passive-automated-failover.
Jonsson, Patrik, "Method for Mapping Interconnections between Load Balanced Applications and Clustered Databases in a Complex Server Environment", In Thesis, Jun. 2008, 21 pages.
Addo, et al., "A Reference Architecture for High-Availability Automatic Failover between PaaS Cloud Providers", In Proceedings of International Conference on Trustworthy Systems and their Applications, Jun. 9, 2014, pp. 14-21.
"Designing an Oracle Fail Safe Solution", Published on: Oct. 17, 2014 Available at: https://docs.oracle.com/cd/E16161_01/doc.342/e14973/makefs.htm#OFSCN169.
"Understanding Active-Passive, Active/Active Load Balancing", Published on: Jan. 2013 Available at: http://www.loadbalancerblog.com/blog/2013/01/understanding-active-passive-activeactive-load-balancing#sthash.Vv0aJUUT.dpuf.
"International Search Report and Written Opinion Issued in PCT Application No. PCT/US2016/041415", dated Sep. 20, 2016, 12 Pages.
Yu, et al., "Authority Server Selection of DNS Caching Resolvers", In the Proceedings of Computer Communication Review, vol. 42, Issue 2, Apr. 2012, pp. 81-86.
Mockapetris, P., "Domain Names—Implementation and Specification", In JCT-VC Meeting, Network Working Group, Request for Comments: 1035, Nov. 1, 1987, 56 Pages.

\* cited by examiner

PASSIVE DELEGATIONS AND RECORDS

BACKGROUND

In a computer network such as the Internet, users can identify web servers, email servers, or other resources by alphanumerical domain names. However, routers, switches, and other network services or devices identify such resources by numerical IP addresses. A domain name system facilitates operations of such computer networks by providing a translation service between the alphanumeric domain names and numerical IP addresses. For example, a domain nameserver can translate the domain name "www.example.com" to the IP address "192.168.0.1." Routers, switches, or other computer services or devices can then access resources associated with this domain name based on the IP address.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In a domain name system, authoritative servers are specifically configured to provide authoritative translations of domain names. Multiple authoritative servers typically operate concurrently for a domain name to provide redundancy, load balancing, and/or other suitable functions. Such an arrangement allows operation of the domain name system as long as at least one authoritative server is reachable. However, the foregoing arrangement does not provide any contingency when none of the authoritative servers is reachable. Several embodiments of the disclosed technology can provide such backup capabilities to the DNS system by implementing standby authoritative servers that are only accessed when none of the concurrent authoritative servers are reachable, or when a number of reachable concurrent authoritative servers falls below a predetermined threshold (e.g., one, two, etc.).

Several embodiments of the disclosed technology can increase reliability of a DNS system by providing contingent backup capability. Even when all of the concurrent authoritative servers are unreachable, the standby authoritative server(s) can still facilitate continued operation of the DNS system by providing at least basic name resolution capabilities. Also, such standby authoritative server(s) can be cost-efficient and simple to implement due to low functionality requirements. For instance, to provide only basic name resolution capabilities, the standby authoritative server(s) can be implemented on less costly servers than the concurrent authoritative servers. Such standby authoritative server(s) can also have low maintenance requirements by, for example, storing information that does not require constant updating. In addition, failover to such standby authoritative server(s) can be straightforward because standby authoritative server(s) can be idle during normal operation.

DETAILED DESCRIPTION

Figure 1:
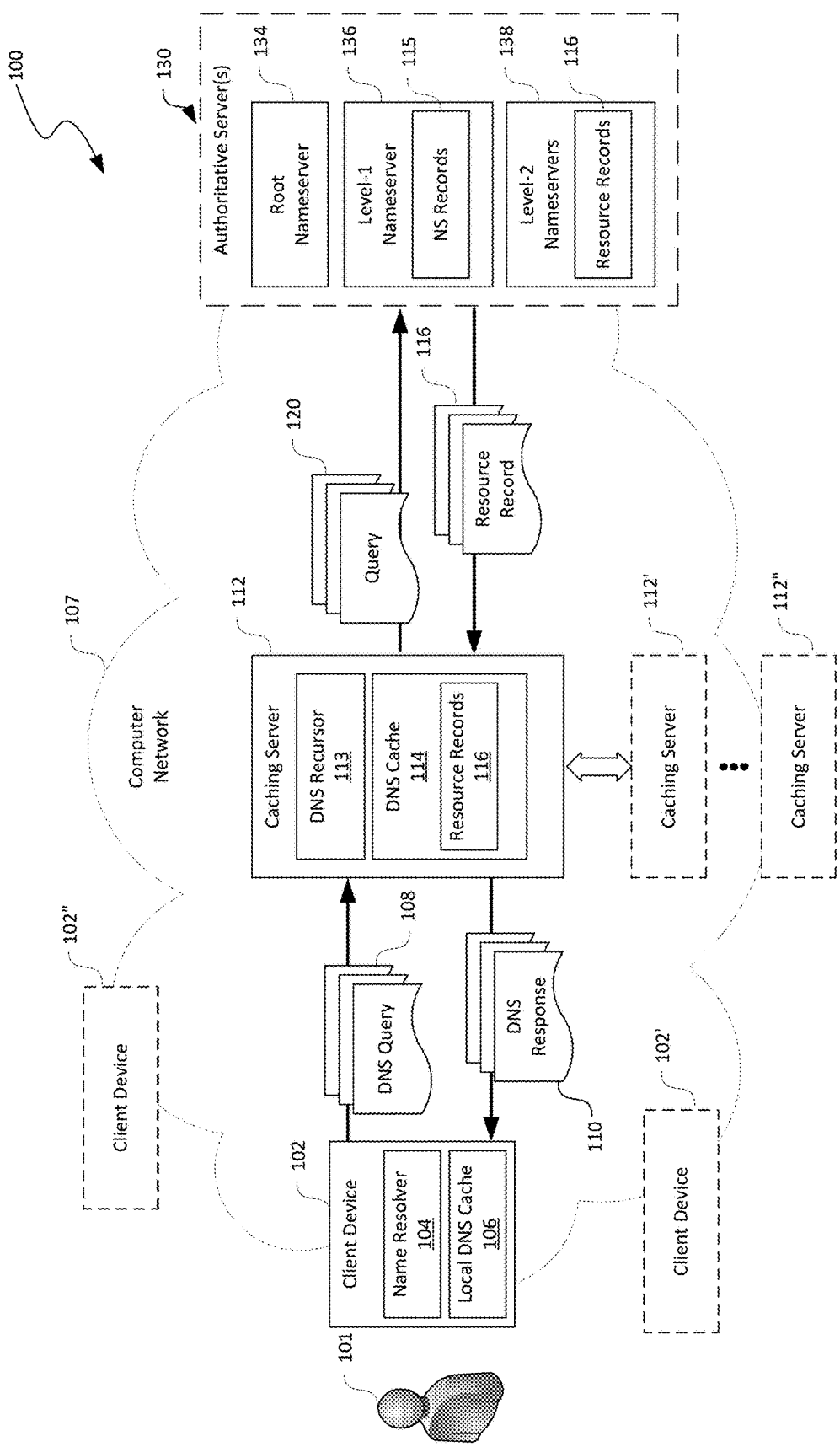
FIG. 1 is a schematic diagram illustrating computing frameworks having passive nameserver(s) in accordance with embodiments of the disclosed technology.

Certain embodiments of systems, devices, components, modules, routines, and processes for managing backup capability of domain name systems via passive nameserver delegations and records are described below. In the following description, specific details of components are included to provide a thorough understanding of certain embodiments of the disclosed technology. A person skilled in the relevant art will also understand that the disclosed technology may have additional embodiments or may be practiced without several of the details of the embodiments described below with reference to FIGS. 1-7.

As used herein, the term "domain name system" or "DNS" generally refers to a computer system configured to translate alphanumerical domain names into numerical IP addresses to effect communications in a computer network. In the following description, such translation can be referred to as "name resolution" or "resolving a domain name." A domain name system can include one or more operatively coupled DNS servers containing a database of domain name translations. Example DNS servers can include authoritative servers and caching servers organized into a hierarchy. One example DNS computing framework is described below with reference to FIG. 1.

An "authoritative server" generally refers to a DNS server configured to return authoritative domain name translations for particular domain names in response to DNS queries. For example, an authoritative server can contain a mapping of URLs of domain names to IP addresses defined by domain administrators or other authorized entities. In another example, an authoritative server can also contain a mapping of a host portion of email addresses (e.g., "@hotmail.com") to IP addresses. In a further example, an authoritative server can also contain name server ("NS") records of other authoritative servers to which resolution authority is delegated. Authoritative servers for a domain or host may be configured by DNS hosting companies or network registrars, such as, for example, Amazon, GoDaddy, or Verisign.

A "caching server" generally refers to a DNS server configured to resolve a domain name of a target domain by, for example, recursively querying authoritative servers. For instance, each part of the URL "www.example.com" has a specific DNS server (or group of servers) that is authoritative. A root server can contain network addresses of authoritative servers for top-level domains such as ".com," ".net," or ".org." In one example resolution operation, a caching server can first query the root server for network addresses of authoritative servers for the ".com" domain. Then, the caching server queries the ".com" authoritative server for network addresses of authoritative servers for "example.com" domain. The caching server can then query the authoritative servers for the "example.com" domain for an IP address associated with the domain name "www.example.com."

Also used herein, the term a "DNS query" generally refers to an electronic data package representing a request from, e.g., a caching server to an authoritative server for retrieving DNS records. For example, an A-type DNS query is a request for retrieving a 32-bit IPv4 address of a target domain name. An AAAA-type DNS query is a request for retrieving a 128-bit IPv6 address of a target domain name. In accordance with embodiments of the disclosed technology, an name server ("NS")-type query can be a request for retrieving an NS record that can include URLs of active and passive authoritative servers for a target domain name.

As used herein, an "active authoritative server" or "active nameserver" generally refers to a working authoritative server configured to provide name resolution and/or other suitable DNS functionalities on a generally continuous basis. In contrast, a "passive authoritative server" or "passive nameserver" generally refers to a standby authoritative server configured to be accessed for name resolution only upon certain conditions. In one example, a passive authoritative server can be accessed only when none of the associated active authoritative servers are reachable. In another example, a passive authoritative server can be accessed only when a number of reachable active authoritative servers falls below a threshold selected by an administrator or other suitable entities.

In accordance with embodiments of the disclosed technology, authoritative servers listed in an NS record can be divided into active and passive authoritative servers. In certain embodiments, active and passive authoritative servers can be identified by corresponding prefixes, suffixes, or other suitable indicators in associated URLs. For instance, a ".com" authoritative server can have example an NS record associated with the domain name "www.example.com" as follows:

| Owner name | Class | Record type | Target Name |
|---|---|---|---|
| www.example.com | IN | NS | ns1.example.com |
| www.example.com | IN | NS | ns2.example.com |
| www.example.com | IN | NS | pns1.example.com |
| www.example.com | IN | NS | pns2.example.com |

As shown above, each entry of the example NS record can include four fields: owner's name (i.e., "www.example.com"), class (i.e., "IN" indicating Internet), record type (i.e., "NS"), and target name (e.g., ns1.example.com). According to the above example NS records, active authoritative servers for the domain name "www.example.com" are located at URLs "ns1.example.com" and "ns2.example.com." Corresponding passive authoritative servers are identified by the prefix "pns," and are located at are located at URLs "pns1.example.com" and "pns2.example.com."

In other embodiments, the active and passive authoritative servers can also be identified by a flag in, for example, the record type field. For instance, the foregoing NS record associated with the domain name "www.example.com" can be as follows:

| Owner name | Class | Record type | Target Name |
|---|---|---|---|
| www.example.com | IN | NS | ns1.example.com |
| www.example.com | IN | NS | ns2.example.com |
| www.example.com | IN | PNS | ns3.example.com |
| www.example.com | IN | PNS | ns4.example.com |

As shown above, authoritative servers "ns1.example.com" and "ns2.example.com" are indicated in the record type field as active authoritative servers with the indicator "NS." Authoritative servers "ns3.example.com" and "ns4.example.com" are indicated in the record type field as passive authoritative servers with the indicator "PNS." In further examples, The active and/or passive authoritative servers may be identified in the NS record with a flag in another field (e.g., active/passive field, not shown) or in other suitable manners.

A domain name system typically includes multiple authoritative servers and caching servers. The authoritative servers are configured to return specific domain name translations in response to DNS queries received from caching servers. Caching servers are configured to retrieve the translations from the authoritative servers and store (or "cache") the retrieved translations for a period of time for responding to DNS queries from client devices. To resolve a domain name (e.g., "www.example.com"), a caching server can query a higher level server (e.g., a ".com" server) for an NS record that contains one or more URLs of delegated authoritative servers for the domain name. Based on the NS record, the caching server can locate the authoritative server(s) to retrieve a translation (e.g., IP address of "192.168.0.1") corresponding to the domain name.

Typically, an NS record associated with a domain name include URLs of multiple authoritative servers for redundancy, load balancing, and/or other suitable functions. For instance, an NS record for the domain name "www.example.com" can include two, three, or four URLs of authoritative servers such as, for example, "ns1.example.com," "ns2.example.com," "ns3.example.com," etc. A caching server can query all of these authoritative servers based on, for example, response times of previous queries to these authoritative servers. Thus, when "ns1.example.com" has a response time that is about the same as that of "ns2.example.com," the caching server can query them generally evenly. In another example, when "ns1.example.com" has a response time lower than that of "ns2.example.com," the caching server may query "ns1.example.com" more often than "ns2.example.com." The foregoing arrangement of multiple authoritative servers, however, do not provide any backup capabilities when all of the authoritative servers are unreachable or otherwise inaccessible. For example, when none of "ns1.example.com" or "ns2.example.com" is accessible, the caching server may fail to provide a response to a DNS query for "www.example.com" unless a resource record is already cached.

Several embodiments of the disclosed technology can provide such backup capabilities to the DNS system by implementing passive authoritative servers that are only accessed when none (or a predetermined number) of active authoritative servers is reachable. For instance, as described above, an NS record for "www.example.com" can also include URLs of the passive authoritative servers "pns1.example.com" and "pns2.example.com." During operation, a caching server queries active authoritative servers such as "ns1.example.com" or "ns2.example.com" when at least one of these active authoritative servers is available. The caching server can be configured to query passive authoritative server "pns1.example.com" or "pns2.example.com" only when a number of available active authoritative servers falls below a predetermined threshold. Thus, in certain implementations, passive server "pns1.example.com" is queried only when none of the active authoritative server is reachable.

Several embodiments of the disclosed technology can increase reliability of a DNS system by providing passive or emergency backup capabilities. For instance, even when all of the active authoritative servers are unreachable, the passive authoritative server(s) can still facilitate continued operation of computing systems and/or networks by providing at least basic name resolution capabilities. Also, passive authoritative server(s) can be simple to implement due to reduced functionality requirements. For instance, passive authoritative server(s) can be implemented to provide only basic name resolution capabilities without full functionalities of corresponding active authoritative servers. Thus, passive authoritative server "pns1.example.com" or "pns2.example.com" can be implemented on less costly servers and require less configuration than those for "ns1.example.com" or "ns2.example.com." Further, passive authoritative server(s) can have low maintenance requirements by, for example, storing domain name translations or other suitable information that does not requiring constant or even periodic updating. In addition, failover to passive authoritative server(s) can be straightforward because passive authoritative server(s) are not accessed during normal operation.

FIG. 1 is a schematic diagram illustrating a DNS computing framework 100 having advanced backup capability in accordance with embodiments of the disclosed technology. As shown in FIG. 1, the computing framework 100 can include a client device 102, a caching server 112, and one or more authoritative servers 130 interconnected by a computer network 107. The computer network 107 can include the Internet, a local area network, a metropolitan area network, a wide area network, and/or other suitable types of network.

The client device 102, the caching server 112, and the authoritative servers 130 can each include a processor and memory (not shown) containing instructions for execution by the processor to provide certain software components discussed in more detail below. Even though particular components of the computing framework 100 are shown in FIG. 1, in other embodiments, the computing framework 100 can also include additional and/or different components. For example, the computing framework 100 can include additional caching servers 112' and 112", additional client devices 102' and 102", and/or other suitable components.

The client device 102 can include a desktop, a laptop, a tablet, a smartphone, and/or other suitable types of computing device. For example, the client device 102 can be an iPhone or iPad provided by Apple, Inc. of Cupertino, Calif., an Android device, a Chromebook device, a Windows device, or any other suitable devices. In the illustrated embodiment of FIG. 1, the client device 102 can include a name resolver 104 and a local DNS cache 106. In other embodiments, the client device 102 may also include other suitable hardware and/or software components. The name resolver 104 can be configured to determine a network address (e.g., an IP address) associated with a domain name (e.g., "www.example.com"). The name resolver 104 may be a part of an operating system or an application executing on the client device 102.

The local DNS cache 106 can be configured to store resource records of previously resolved domain names. In one embodiment, the name resolver 104 can determine an IP address by accessing a resource record stored in the local DNS cache 106. In other embodiments, when a resource record does not exist in the local DNS cache 106, the name resolver 104 can query the caching server 112 for the desired resource record 116 by, for example, transmitting a DNS query 108 to the caching server 112 and receiving a DNS response 110 from the caching server 112.

The authoritative servers 130 can include a plurality of DNS servers arranged in a hierarchy. For example, as shown in FIG. 1, the authoritative servers 130 can include a root nameserver 134, a level-1 nameserver 136 subordinate to the root nameserver 134, and a level-2 nameservers 138 subordinate to the level-1 nameserver 136. Even though a three-level hierarchy of DNS servers 130 is shown in FIG. 1, in other embodiments, the authoritative servers 130 can include one, two, four, or any other suitable number of levels and/or servers. For example, the authoritative servers 130 can also include a level-3 nameserver (not shown) subordinate to the level-2 nameserver 138.

As shown in FIG. 1, in the hierarchy of the authoritative servers 130, the root nameserver 134 can contain a resource record (not shown) containing a network address for the level-1 nameserver 136 corresponding to, e.g., a top-level domain such as ".com". The level-1 nameserver 136 can include a NS record 115 containing URLs for the level-2 nameservers 138 corresponding to a domain name, e.g., "example.com." The level-2 nameservers 138 can then include a resource record 116 containing an IP address (e.g., 192.168.0.1) that corresponds to a server associated with the domain name "www.example.com." Though not shown in FIG. 1, the level-2 nameservers 138 can include a set of active authoritative servers and another set of passive authoritative servers all identified in the NS record 115, as discussed in more detail below with reference to FIGS. 2A and 2B.

As shown in FIG. 1, the caching server 112 can include a DNS recursor 113 operatively coupled to a DNS cache 114. The DNS recursor 113 can be configured to recursively resolve a domain name of a target domain by transmitting a query 120 to and receiving NS record 115 or resource record 116 from the one or more authoritative servers 130. The DNS cache 114 can be configured to store any resource records 116 previously resolved by the DNS recursor 113 for a period of time, for example, as specified by a time-to-live value. In certain embodiments, a value of the time-to-live period can be set by one or more of the authoritative servers 130. In other embodiments, the time-to-live value may be set by an administrator, an application, or other suitable entities.

The caching server 112 can be configured to return a copy of the cached resource records 116 as a DNS response 110 in response to a DNS query 108 from the client device 102. In one embodiment, the caching server 112 can determine if a resource record 116 corresponding to a domain name already exists in the DNS cache 114. If the resource record 116 already exists in the DNS cache 114, the caching server 112 transmits a copy of the resource record 116 as a DNS response 110 to the client device 102 via the computer network 107. If a resource record 116 does not exist in the DNS cache 114, the caching server 112 can invoke the DNS recursor 113 to retrieve a copy of the resource record 116 from the authoritative servers 130.

In operation, a user 101 can request access to a domain name (e.g., "www.example.com") using the client device 102. The name resolver 104 at the client device 102 can first determine if a resource record 116 for the requested domain name already exists or cached in the local DNS cache 106. If one already exists, the client device 102 can initiate network operations to servers associated with the domain name based on the cached resource record 116. If one does not exist, the client device 102 can consult the caching server 112 for a corresponding resource record 116.

In response to the received request, the caching server 112 can first determine if a resource record 116 is available in the DNS cache 114. If one is available, the caching server 112 can return the resource record 116 as a DNS response 110. If one is not available, the caching server 112 can invoke the DNS recursor 113 to recursively query the authoritative servers 130. For example, the caching server 112 can first query the root nameserver 134 for a resource record containing a network address of the level-1 nameserver 136 (e.g., 198.41.0.4). Then, the caching server 112 can query the level-1 nameserver 136 for a NS record 115 containing a network address of the level-2 nameserver 138.

The caching server 112 can then query an active authoritative server in the level-2 nameservers 138 to retrieve a copy of the resource record 116 containing a network address of the requested domain name (e.g., 192.168.0.1) that corresponds to a server associated with the domain name "www.example.com." If the active authoritative server in the level-2 nameservers 138 is not reachable, the caching server 112 can query additional active authoritative server if one is available. If none of the active authoritative servers is reachable, the caching server 112 can then query one or more passive authoritative servers for the resource records 116, as described in more detail below with reference to FIGS. 2A and 2B.

Figure 2A:
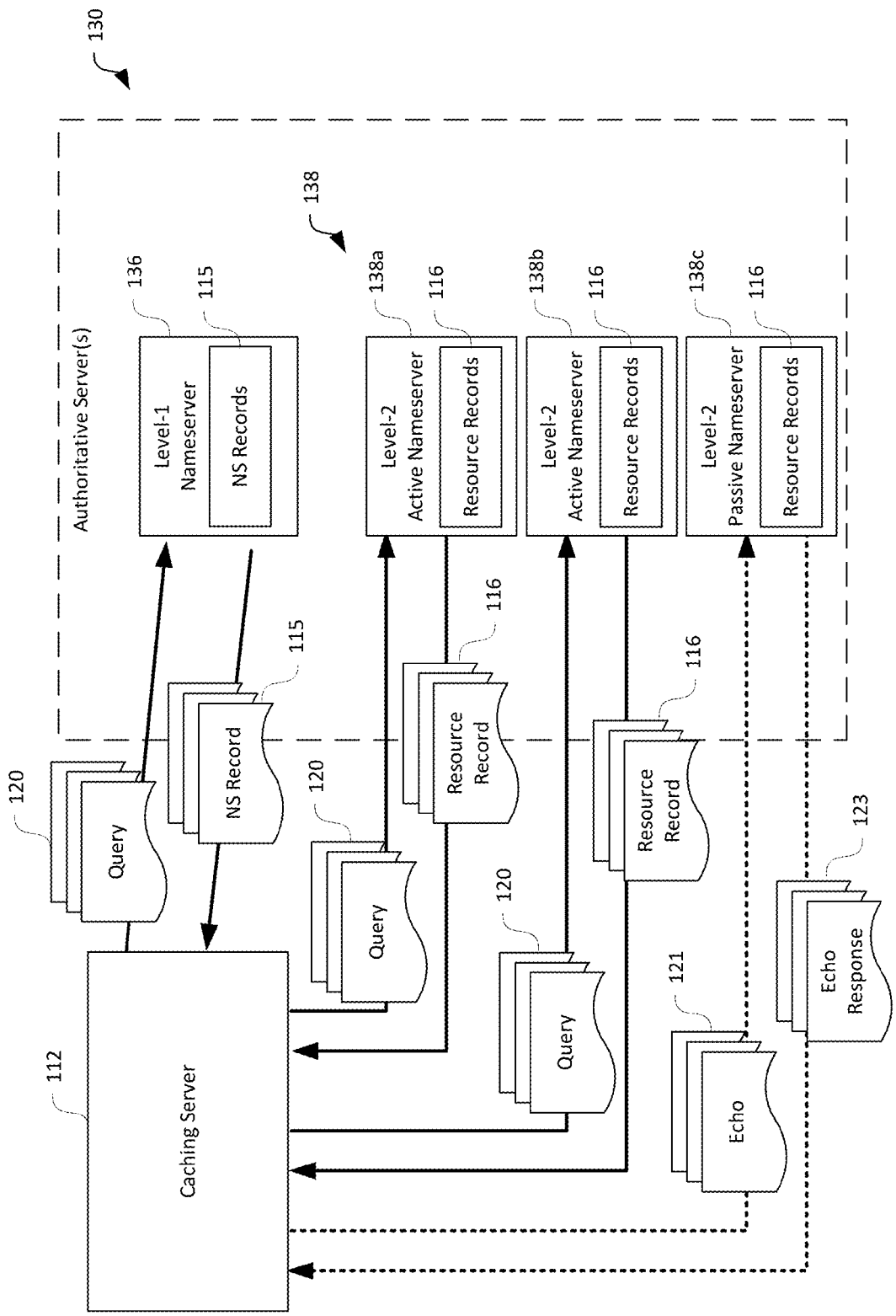
FIGS. 2A and 2B are schematic diagrams illustrating a portion of the computing framework during normal operation and emergency operation, respectively, in accordance with embodiments of the disclosed technology.
Figure 2B:
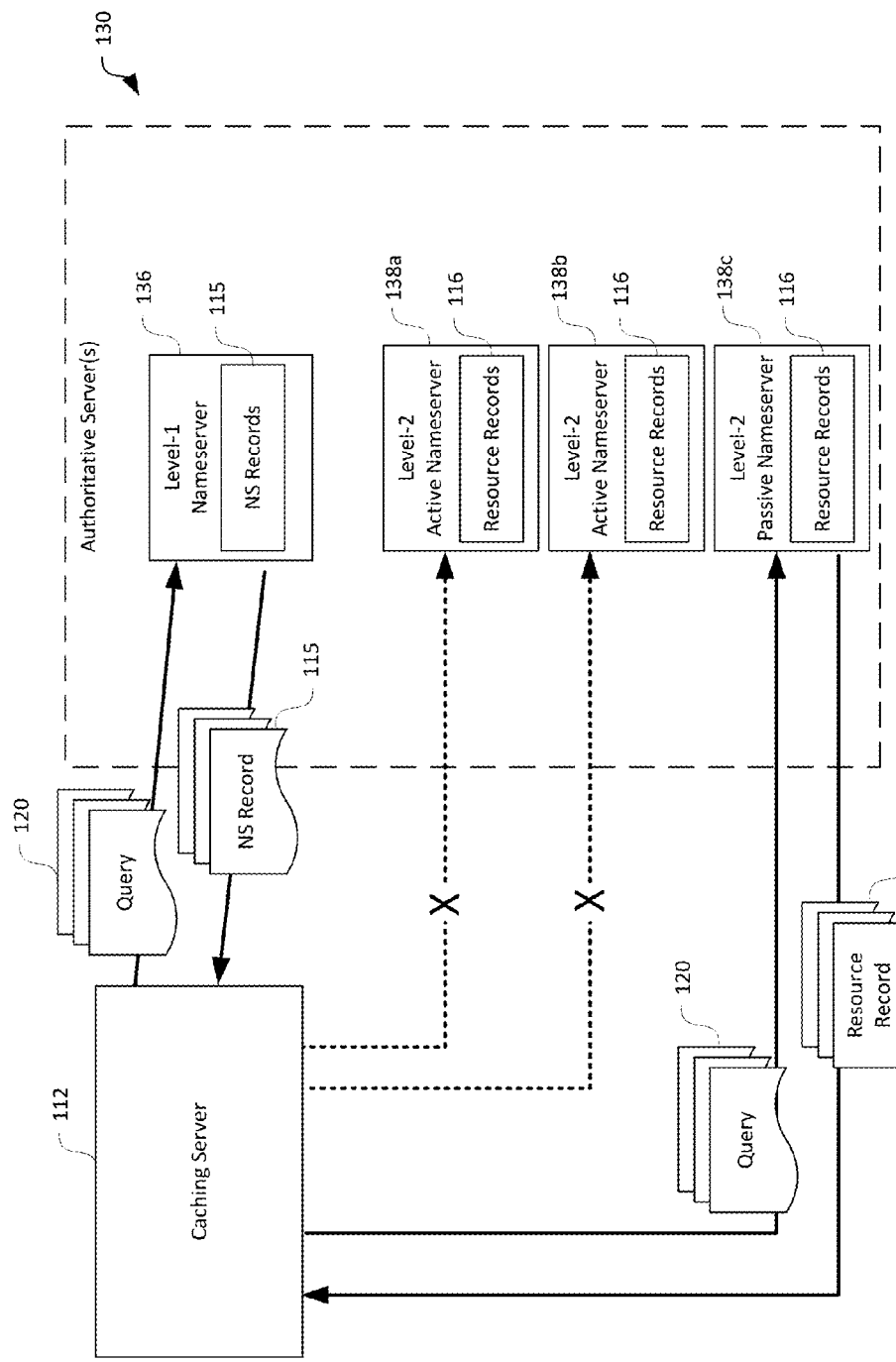

FIGS. 2A and 2B are schematic diagrams illustrating a portion of the computing framework 100 in FIG. 1 during first and second operational modes, respectively, in accordance with embodiments of the disclosed technology. In particular, FIG. 2A illustrates a first operational mode in which at least one active nameserver is reachable. FIG. 2B illustrates a second operational mode in which no active nameservers is reachable and a passive nameserver is accessed for name resolution. Certain components of the computing framework 100 of FIG. 1 are omitted in FIGS. 2A and 2B for clarity.

As shown in FIG. 2A, the level-2 nameservers 138 can include a first active nameserver 138a, a second active nameserver 138b, and a passive nameserver 138c. Even though particular number of active and passible nameservers 138a-138c are shown in FIG. 2A, in other embodiments, the level-2 nameservers 138 can include any other suitable numbers of active and/or passive nameservers. The level-1 nameserver 136 can contain an NS record 115 that identifies each of the first and second active nameservers 138a and 138b and the passive nameserver 138c.

In certain embodiments, the first and second active nameservers 138a and 138b can be implemented with functionalities that the passive nameserver 138c does not have. For example, the first and second active nameservers 138a and 138b can be implemented to provide name resolution between virtual machines located in the same cloud service, in different cloud services, in the same virtual network, or in different virtual networks, that the passive nameserver 138c does not provide. Instead, the passive nameserver 138c can be implemented with limited functionalities to provide, for example, basic name resolution for select domain names (e.g., upper-level domain names or default IP addresses for domain names). For convenience of discussion, in the following description, the first and second active nameservers 138a and 138b and the passive nameserver 138c all contain the same resource record 116 associated with an example domain name "www.example.com".

During operation, the caching server 112 can first query the level-1 nameserver 136 for resolving the domain name "www.example.com". In response, the level-1 nameserver 136 provides an NS record 115 associated with the domain name to the caching server 112. Based on the received NS record 115, the caching server 112 can determine that the first and second active nameservers 138a and 138b and the passive nameserver 138c are authoritative for the domain name "www.example.com". In response, the caching server 112 can query the first or second active nameservers 138a and 138b for a resource record 116 associated with "www.example.com". In certain embodiments, the caching server 112 can query the first or second active nameservers 138a and 138b randomly, alternately, or in other suitable orders. In other embodiments, the caching server 112 can query the first or second active nameservers 138a and 138b based on, for example, response times to previous queries to these name servers. In yet other embodiments, the caching server 112 can determine which one of the first or second active nameservers 138a and 138b to query based on other suitable criteria. Upon receiving the query 120 from the caching server 112, the first or second nameserver 138a and 138b can transmit the requested resource record 116 to the caching server 112.

During operation in the first operational mode, the caching server 112 does not query the passive nameserver 138c unless both the first and second active nameservers 138a and 138b are unreachable. When, for example, the first active nameserver 138a is unreachable, the caching server 112 can contact the second active nameserver 138b for the resource record 116, or vice versa. The passive nameserver 138c can be in standby with little or no access from the caching server 112. As such, configuration, maintenance, or other work can be readily performed on the passive nameserver 138c. In certain embodiments, the caching server 112 can periodically transmit echo messages 121 to the passive nameserver 138c. Upon receiving the echo message 121, the passive nameserver 138c can provide an echo response 123 configured to indicate a status (e.g., online, offline, etc.) of the passive nameserver 138c. In other embodiments, the caching server 112 can transmit no messages to the passive nameserver 138c as long as a predetermined number of active nameservers 138a and 138b are reachable.

As shown in FIG. 2B, the caching server 112 can determine that the first and second active nameservers 138a and 138b are both unreachable by contacting these nameservers 138a and 138b. In certain embodiments, the caching server 112 can indicate that the first and/or second nameservers 138a and 138b are unreachable in response to not receiving the requested resource record 116 in a predetermined period of time, or not receiving any response from the first and/or second nameservers 138a and 138b after a predetermined number of retries. In other embodiments, the caching server 112 can indicate that the first and/or second nameservers 138a and 138b are unreachable based on other suitable conditions. In response, the caching server 112 transmits a query 120 to the passive nameserver 138c. In response to the received query 120, the passive nameserver 138c can provide the resource record 116 to the caching server 112.

During operation in the second operational mode, the caching server 112 can also periodically contacting the first and/or second active nameservers 138a and 138b by, for example, transmitting a query 120 thereto. If a response is received from the first and/or second active nameservers 138a and 138b, the caching server 112 can cease accessing the passive nameserver 138c and revert to the first operational mode, as described with reference to FIG. 2A.

Even though the second operational mode is described above as being based on the condition that none of the first and second active nameservers 138a and 138b are reachable, in other embodiments, the second operational mode can also be based on a condition that a predetermined number of active nameservers 138a and 138b remains reachable or becomes unreachable. In one example, the second operational mode can be initiated when only one active nameserver 138a or 138b remains reachable. In another example, in response to determining that one or two of the active nameservers 138a and 138b become unreachable, the caching server 112 can start querying the passive nameserver 138c. In further examples, the second operational mode may be initiated based on operator input or other suitable conditions.

In FIGS. 2A and 2B, only one passive nameserver 138c is shown for illustration purposes. In other embodiments, the level-2 nameservers 138 can include two, three, or any suitable number of passive nameservers. During operation in the second operational mode, the caching server 112 can access the passive nameservers randomly, sequentially, or in other suitable orders. In further embodiments, the caching server 112 can also access the passive nameservers based on, for example, response times from previous queries and/or other suitable conditions.

In the foregoing description, the technique of passive nameserver delegation is described using NS records as examples. In other embodiments, such passive nameserver delegation can also be applied to A-type, AAAA-type, DS-type, other suitable types of DNS records. For instance, an A-type DNS record can include both active IP addresses (e.g., 192.168.0.1 to 192.168.0.10) and passive IP addresses (e.g., 172.168.0.1 to 172.169.0.10) for a domain name (e.g., www.example.com). The caching server 112 provides a resource record 116 containing the active IP addresses to a DNS query 108 during normal operation. However, when none (or a predetermined number) of the servers at the active IP addresses are unreachable, the caching server 112 can then provide the passive IP addresses in response to the DNS query 108. Similar to the passive authoritative servers described above, servers at the passive IP addresses can also be cost effective to implement by, for example, only providing fewer number of functionalities as compared to those at the active IP addresses.

Figure 3A:
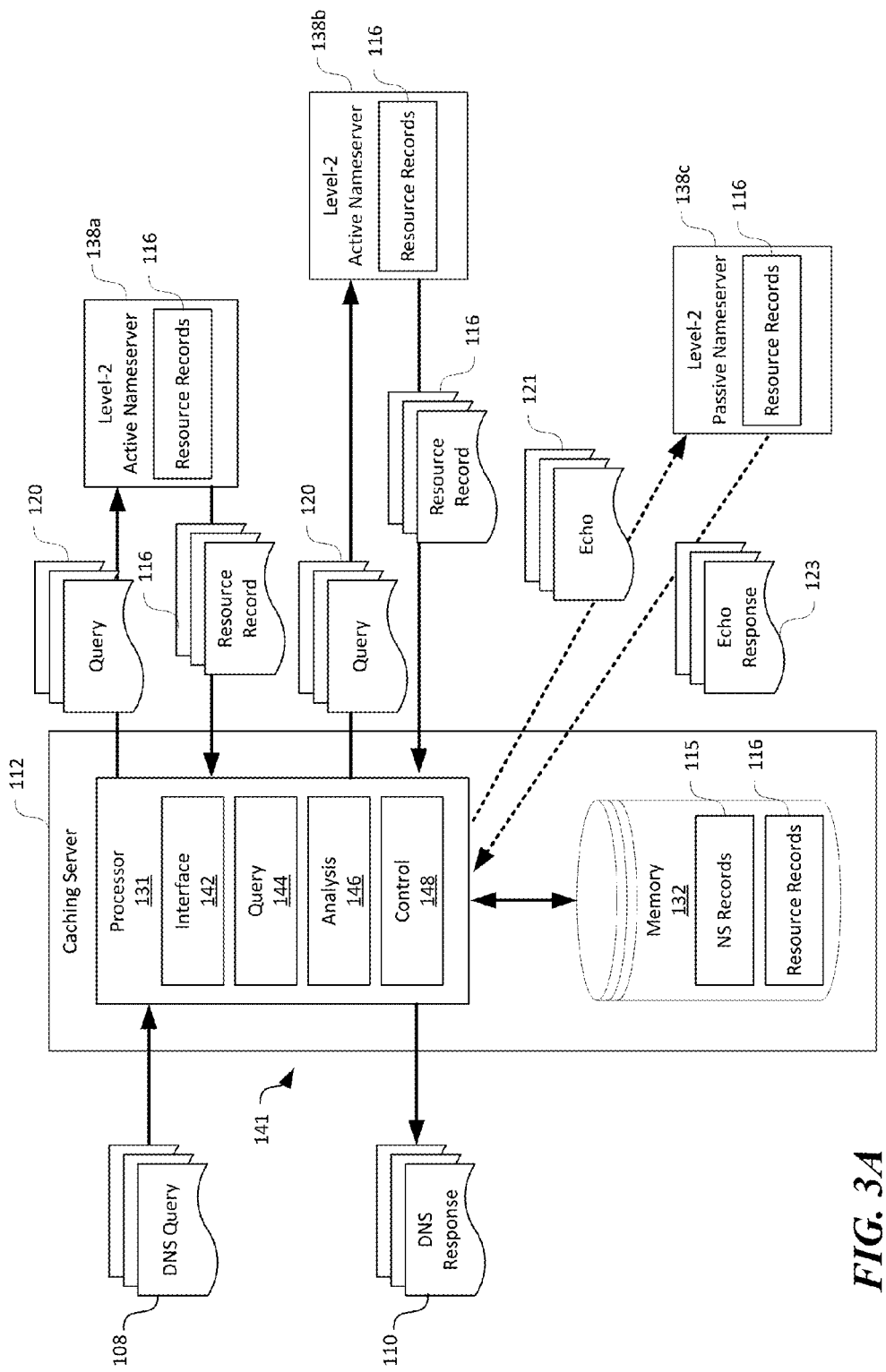
FIGS. 3A and 3B are block diagrams showing software components suitable for the level-1 nameserver of FIG. 1 during normal operation and emergency operation, respectively, and in accordance with embodiments of the disclosed technology.
Figure 3B:
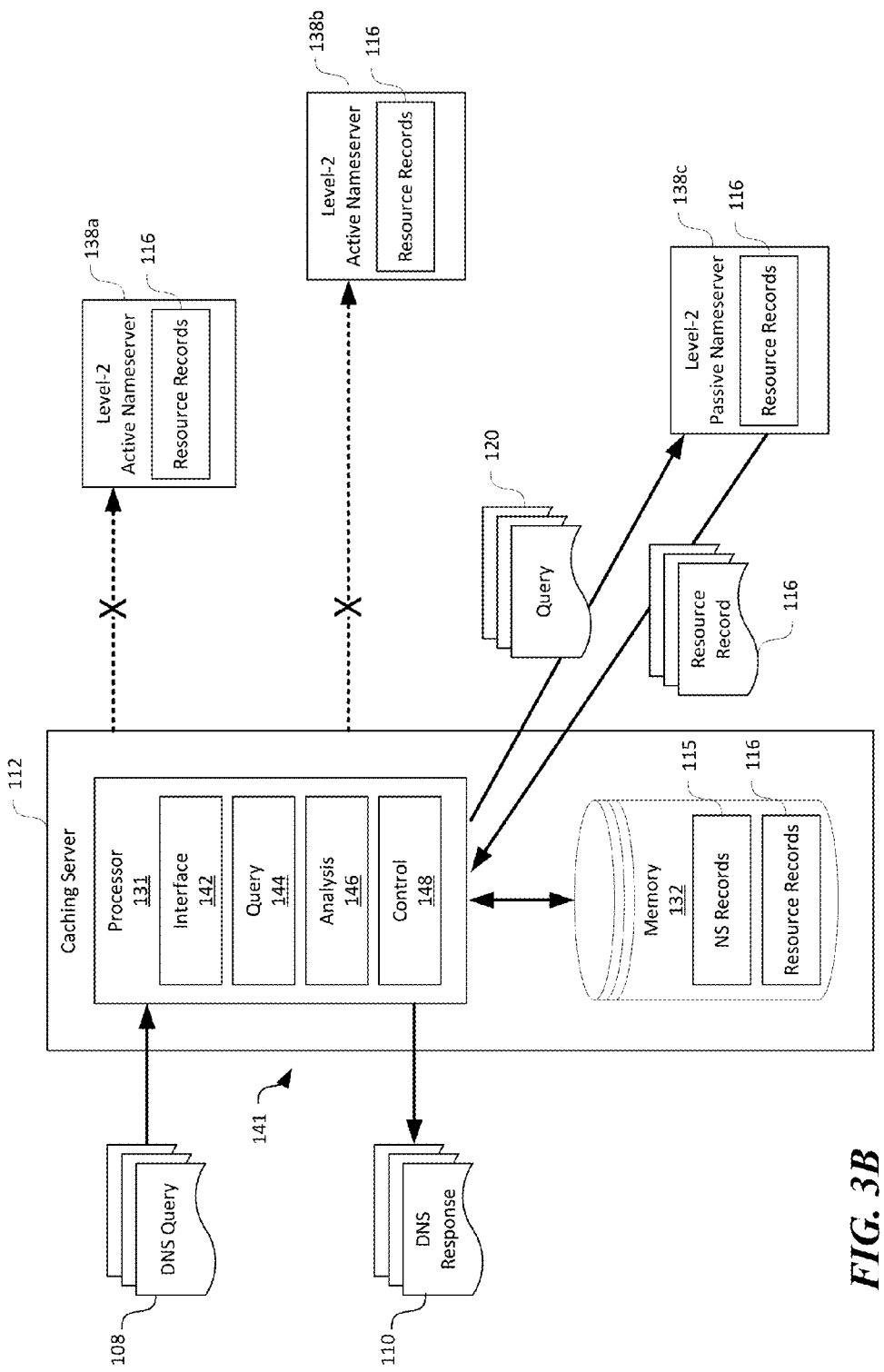

FIGS. 3A and 3B are block diagrams showing software components 141 suitable for the caching server 112 of FIGS. 1-2B during the first and second operational modes, respectively, and in accordance with embodiments of the disclosed technology. In particular, FIG. 3A illustrates the first operational mode in which at least one active nameserver is reachable. FIG. 3B illustrates the second operational mode in which no active nameservers is reachable and a passive nameserver is accessed for name resolution.

In FIGS. 3A and 3B and in other Figures hereinafter, individual software components, objects, classes, modules, and routines may be a computer program, procedure, or process written as source code in C, C++, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads). Components within a system may take different forms within the system. As one example, a system comprising a first component, a second component and a third component can, without limitation, encompass a system that has the first component being a property in source code, the second component being a binary compiled library, and the third component being a thread created at runtime.

The computer program, procedure, or process may be compiled into object, intermediate, or machine code and presented for execution by one or more processors of a personal computer, a network server, a laptop computer, a smartphone, and/or other suitable computing devices. Equally, components may include hardware circuitry. A person of ordinary skill in the art would recognize that hardware can be considered fossilized software, and software can be considered liquefied hardware. As just one example, software instructions in a component can be burned to a Programmable Logic Array circuit, or can be designed as a hardware circuit with appropriate integrated circuits. Equally, hardware can be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 3A, the caching server 112 can include a processor 131 coupled to a memory 132. The processor 131 can include a microprocessor, a field-programmable gate array, and/or other suitable logic devices. The memory 132 can include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the processor 131 (e.g., instructions for performing the methods discussed below with reference to FIGS. 5A-5E). As shown in FIG. 3A, the memory 132 can also contain data representing a set of NS records 115, resource records 116, and/or other suitable data.

The processor 131 can execute instructions to provide a plurality of software components 141 configured to provide backup capability of authoritative nameservers. As shown in FIG. 3A, the software components 141 can include an interface component 142, a query component 144, an analysis component 146, and a control component 148 operatively coupled to one another. In one embodiment, all of the software components 141 can reside on a single computing device (e.g., a DNS server). In other embodiments, the software components 141 can also reside on a plurality of distinct computing devices. In further embodiments, the software components 141 may also include network interface components and/or other suitable modules or components (not shown).

As shown in FIG. 3A, the interface component 142 can be configured to receive a DNS query 108, from, for example, the client device 102 of FIG. 1. The interface component 142 can also be configured to provide a DNS response 110 to the client device 102 in response to the received DNS query 108. Also, the interface component 142 can be configured to transmit one or more query 120 to the first and second active nameservers 138a and 138b and in response, receiving resource records 116. As shown in FIG. 3A, in the first operational mode, the interface component 142 can also be configured to transmit an echo message 121 to and receiving an echo response 123 from the passive nameserver 138c. In certain embodiments, the interface component 142 can include a network interface module with suitable firmware or software to perform the foregoing operations. In other embodiments, the interface component 142 can include other suitable types of communications modules.

The query component 144 can also be configured to process the received DNS query 108. In one embodiment, the query component 144 can retrieve a cached resource record 116 in the memory 132 and construct the DNS response based thereon. If a cached resource record 116 does not exist in the memory 132, the query component 144 can be configured to construct a query 120 to one of the level-2 nameservers 138 for a resource record 116 associated with a domain name. In certain embodiments, the query component 144 can include a data processor that sets appropriate flags or fills in appropriate values in a template of a query/response data structure. One example data structure suitable for the query 120, DNS query 108, and DNS response 110 is described in more detail below with reference to FIGS. 4A and 4B.

The analysis component 146 can be configured to determine when to switch between the first operational mode and the second operational mode. In one embodiment, the analysis component 146 can be configured to receive from the interface component 142 communications status with the various level-2 nameservers 138. Example communications status can include a timeout status, a number of attempted retries, a number of successful prior transactions, and/or other suitable information. Based on the received communications status, the analysis component 146 can indicate a switch from the first operational mode to the second operational mode based on the following example conditions:

- when none of the first and second active nameservers 138a and 138b is reachable;
- when a predetermined number (e.g., one or zero) of the first and second active nameservers 138a and 138b is reachable;
- when a predetermined number (e.g., one or two) of the first and second active nameservers 138a and 138b become unreachable; or
- when a predetermined percentage (e.g., 50%, 40%, 30%, 20%, 10%, or 0%) of the first and second active nameservers 138a and 138b is reachable;
- when a predetermined percentage (e.g., 50%, 40%, 30%, 20%, 10%, or 0%) of the first and second active nameservers 138a and 138b is unreachable; or
- any of the foregoing conditions and no additional active nameserver is listed in the NS record 115.

Based on the received communications status, the analysis component 146 can also indicate a switch from the second operational mode to the first operational mode based on the following example conditions:

- when at least one of the first or second active nameservers 138a and 138b becomes reachable;
- when a predetermined number (e.g., two) of the first and second active nameservers 138a and 138b becomes reachable;
- when a predetermined percentage (e.g., 50%, 40%, 30%, 20%, 10%, or 0%) of the first and second active nameservers 138a and 138b becomes reachable;

The foregoing examples conditions are shown for illustration purposes only. In other embodiments, the analysis component 146 can indicate a switch between the first and second operational modes based on operator input or other suitable conditions.

In certain embodiments, the analysis component 146 can include counters, dividers, comparators, or other suitable data operators suitably coupled to perform the various operations described above. For example, the analysis component 146 can include a comparator having a first input representing a number of reachable active nameservers and a second input representing a threshold. The comparator can also include an output representing a result of a comparison between the number of reachable active nameservers and the threshold. In other embodiments, the analysis component 146 can include data filters, bias operators, and/or other suitable The control component 148 can be configured to direct the interface component 142 to transmit the query 120 to the first and second active nameservers 138a and 138b or the passive nameserver 138c based on the determination of first or second operational mode from the analysis component 146. For example, as shown in FIG. 3A, the control component 148 can direct the interface component 142 to transmit the query 120 to the first and/or second active nameservers 138a and 138b in the first operational mode. In contrast, as shown in FIG. 3B, the control component 148 can direct the interface component 142 to transmit the query 120 to the passive nameserver 138c in the second operational mode.

Figure 4A:
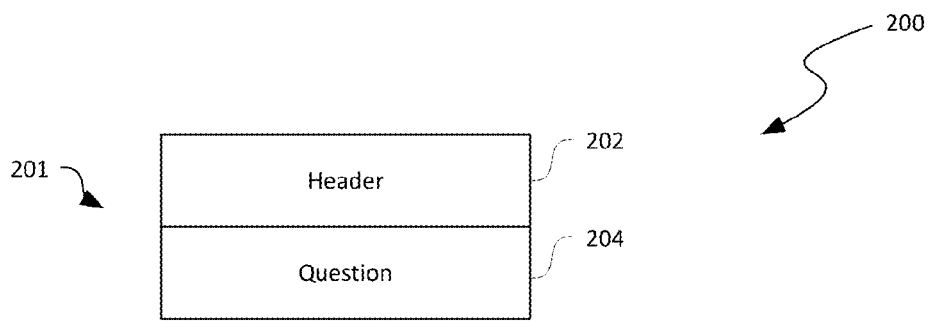
FIG. 4A is a schematic diagram illustration an example data structure suitable for the security query of FIG. 2A in accordance with embodiments of the disclosed technology.

FIG. 4A is a schematic diagram illustrating an example data structure 200 suitable for the query 120 or the DNS query 108 of FIG. 1 in accordance with embodiments of the disclosed technology. As shown in FIG. 4A, the data structure 200 can include a header field 202 and a question field 204. The header field 202 can include parameters that describe the type of query and which fields are contained in the query. For example, the header field 202 can contain a query identifier, a one-bit field that specifies whether the data structure 200 is a query or a response, or other suitable parameters.

Figure 4B:
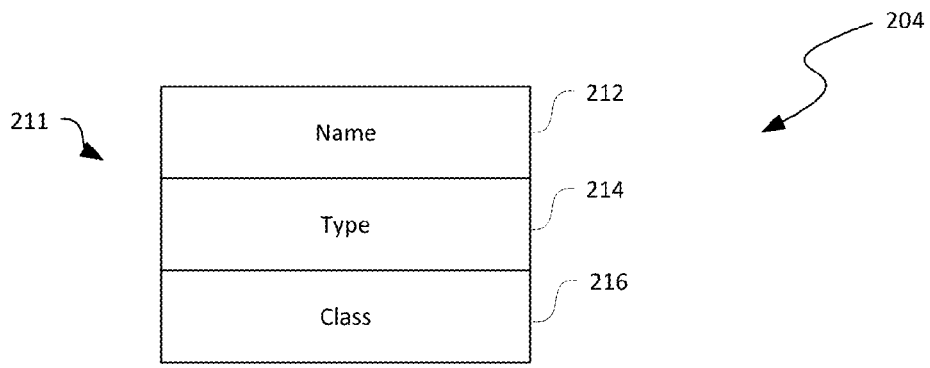
FIG. 4B is a schematic diagram illustration an example data structure suitable for the question field of FIG. 4A in accordance with embodiments of the disclosed technology.

The question field 204 can contain a question for a DNS server (e.g., the level-1 nameserver 136 of FIG. 2A). FIG. 4B is a schematic diagram illustration an example data structure suitable for the question field 204 of FIG. 4A in accordance with embodiments of the disclosed technology. As shown in FIG. 4B, the question field 204 can include a name field 212, a type field 214, and a class field 216. The name field 212 can contain a domain name (e.g., "www.example.com") represented as a sequence of labels (e.g., "example" and "com"). The type field 214 can contain data specifying a query type, for example, data indicating an NS-type query. The class field 216 can contain data specifying the class of the query (e.g., "IN" indicating Internet). In other embodiments, the question field 204 can also include other suitable fields.

Figure 4C:
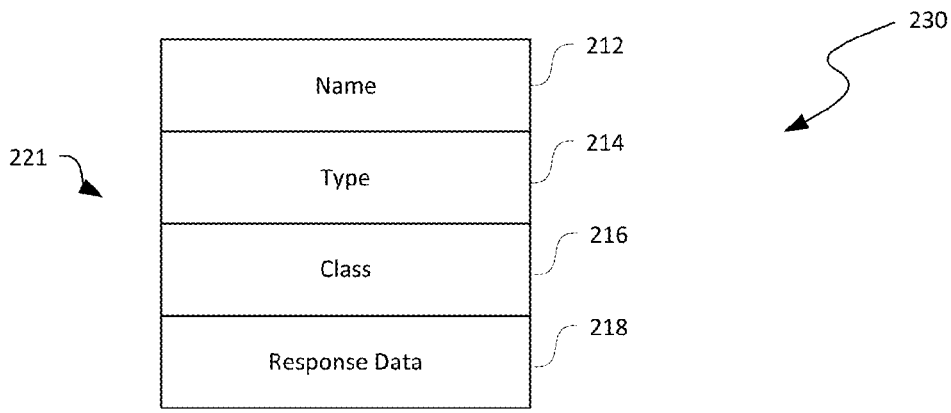
FIG. 4C is a schematic diagram illustration an example data structure suitable for the security record of FIG. 2B in accordance with embodiments of the disclosed technology.

FIG. 4C is a schematic diagram illustration an example data structure 230 suitable for the NS record 115 or resource record 116 of FIGS. 2A and 2B in accordance with embodiments of the disclosed technology. As shown in FIG. 4C, the data structure 230 can include certain fields generally similar to that of FIG. 4B. For example, the data structure 230 can include a name field 212, a type field 214, and a class field 216. The data structure 230 can also include a response data field 218 containing, for example, URLs of the first and second active nameservers 138a and 138b and the passive nameserver 138c of FIGS. 2A and 2B. In other embodiments, the data structure 230 can also include a time-to-live field, a length of response data field, or other suitable fields.

Figure 5A:
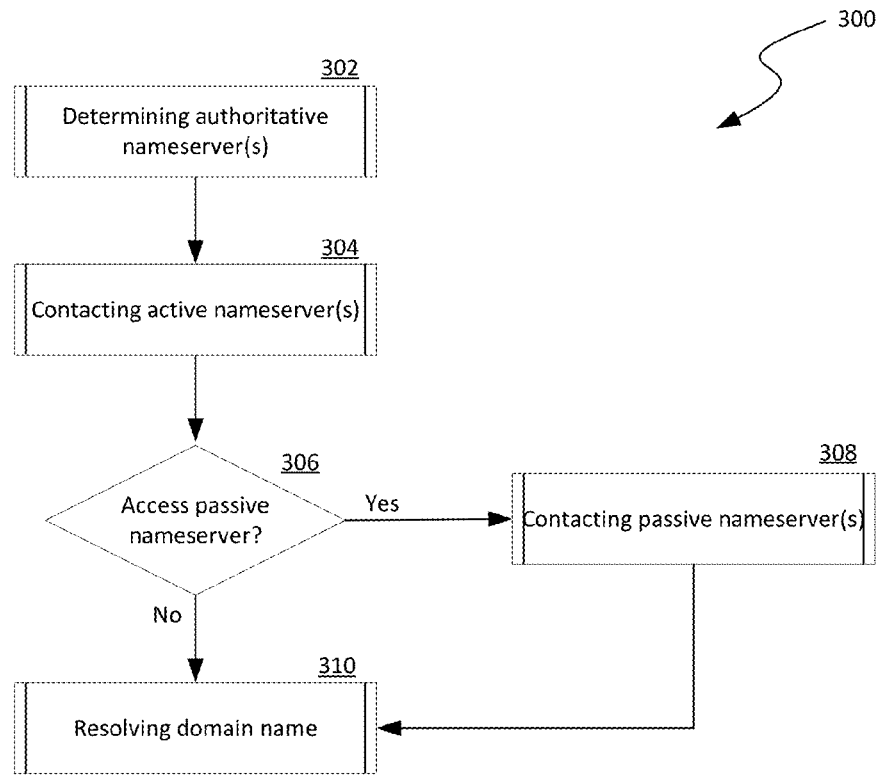
FIGS. 5A-5E are flow diagrams illustrating embodiments of a process of providing backup capabilities to a DNS system in accordance with embodiments of the disclosed technology.

FIG. 5A is a flow diagram illustrating embodiments of a process 300 of providing backup capabilities to a DNS system in accordance with embodiments of the disclosed technology. Even though various embodiments of the process 300 are described below with reference to the computing framework 100 of FIG. 1 and the software components 141 of FIGS. 3A and 3B, in other embodiments, the process 300 may be performed with other suitable types of computing frameworks, systems, components, or modules.

Figure 5B:
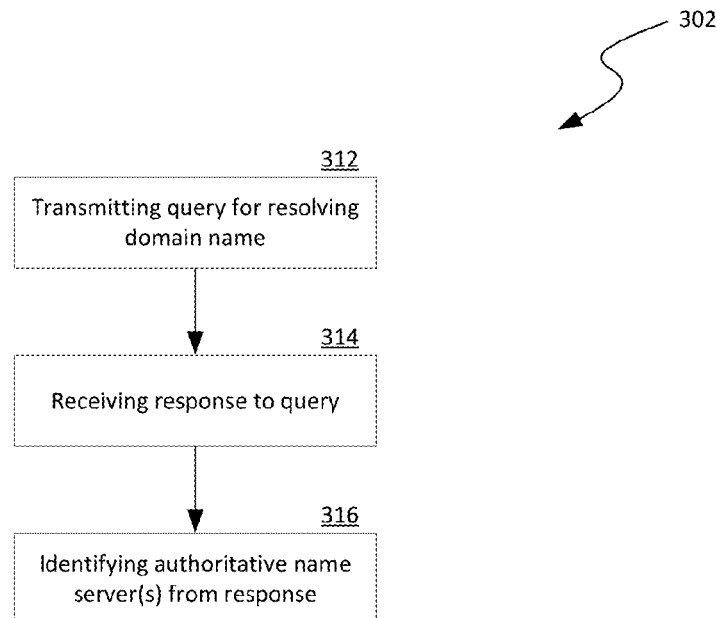

As shown in FIG. 5A, the process 300 can include determining authoritative name servers at stage 302. In certain embodiments, as shown in FIG. 5B, determining the authoritative name servers can include transmitting a query for resolving a domain name at stage 312. The query can be transmitted from, for example, the caching server 112 (FIG. 1) to the level-1 server 136 (FIG. 1). A response to the transmitted query can then be received at stage 314. The received response can have a data structure generally similar to that shown in FIG. 4B. Based on the received response, the process 302 can include identifying authoritative name servers at stage 316. In one embodiment, the identified authoritative name servers can include multiple active nameservers and passive nameservers. In other embodiments, the identified authoritative name servers can include multiple active nameservers and one passive nameserver. In further embodiments, the authoritative name servers may be determined based on cached NS records 115 (FIG. 1) on the caching server 112 or via other suitable techniques.

Figure 5C:
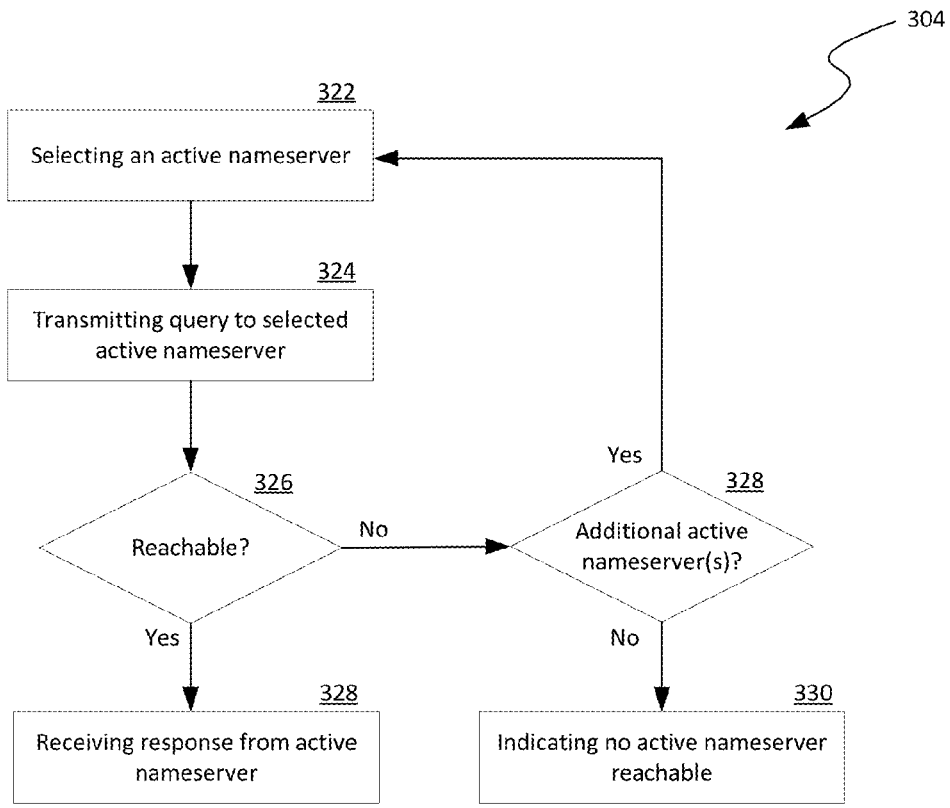

Referring back to FIG. 5A, the process 300 can include contacting active nameservers at stage 304. FIG. 5C shows an example process 304 for contacting the active nameservers. In other embodiments, contacting the active nameservers can include other suitable operations in addition to or in lieu of those shown in FIG. 5C. As shown in FIG. 5C, contacting active nameservers can include selecting an active nameserver at stage 322. In certain embodiments, selection of an active nameserver can be based on previous response times of the identified active nameservers. In other embodiments, the active nameserver can be selected randomly, sequentially, or in other suitable orders. The process 304 can also include transmitting a query for resolving a domain name to the selected active nameserver at stage 324.

The process 304 can then include a decision stage 326 to determine whether the selected active nameserver is reachable. In certain embodiments, the active nameserver is deemed reachable if a response is received from the selected active nameserver in a predetermine period of time or after a predetermined number of retries. In other embodiments, the active nameserver can be deemed reachable or unreachable based on other suitable conditions. In response to determining that the selected active nameserver is reachable, the process 304 includes receiving a response from the selected active nameserver containing, for example, the resource record 116 (FIG. 1) associated with the domain name at stage 328. In response to determining that the selected active nameserver is not reachable, the process 304 includes another decision stage 328 to determine if additional active nameservers are available, for example, listed in the NS record 115. In response to determining that additional nameservers are available, the process 304 reverts to selection another active nameserver at stage 322; otherwise, the process 304 proceeds to indicating that no active nameservers are reachable at stage 330.

Referring back to FIG. 5A, the process 300 can include a decision stage 306 to determine whether to access passive nameserver(s), for example, based on the indication from operation at stage 330 of the process 304. Various conditions may be used to determine whether to access passive nameserver(s). Example conditions are discussed above with reference to FIG. 3A. In response to determining to access passive nameserver(s), the process 300 can proceed to contacting passive nameserver(s) at stage 308.

Figure 5D:
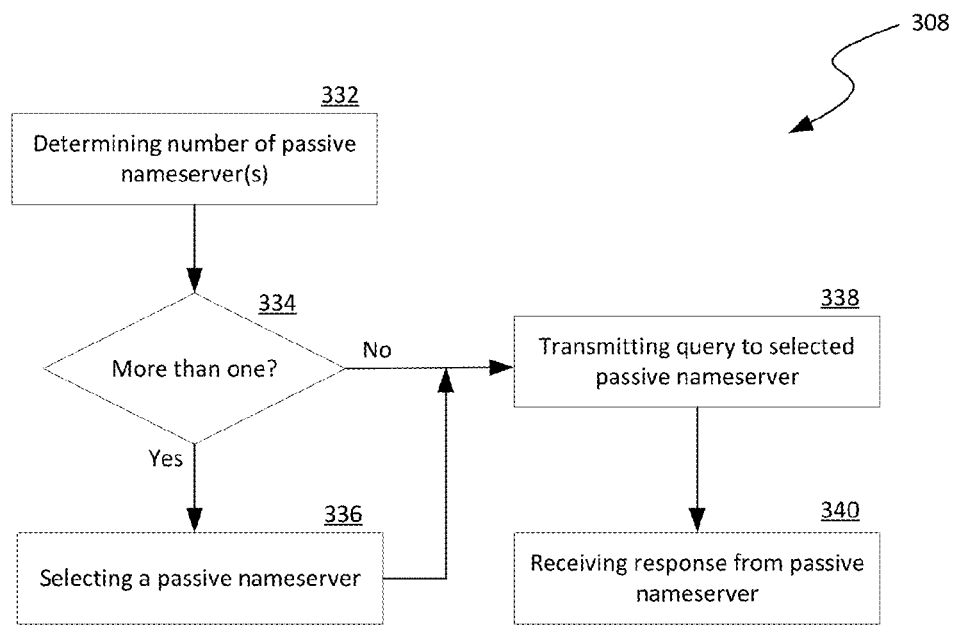

FIG. 5D illustrates one example process 308 for contacting passive nameserver(s). As shown in FIG. 5D, the process 308 can include determining a number of passive nameservers at stage 332, for example, based on entries in the NS record 115 (FIG. 1). The process 308 can then include a decision stage 334 to determine if more than one passive nameservers are available. In response to determining that more than one passive nameservers are available, the process 308 includes selecting one of the passive nameservers based on similar or different conditions for selecting active nameservers discussed above with reference to FIG. 5B. The process 308 can then proceed to transmitting a query to the selected passive nameserver at stage 338 and receiving a response from the selected passive nameserver at stage 340. In response to determining that only one passive nameserver is available, the process 308 proceeds directly to transmitting a query to the selected passive nameserver at stage 338.

Figure 5E:
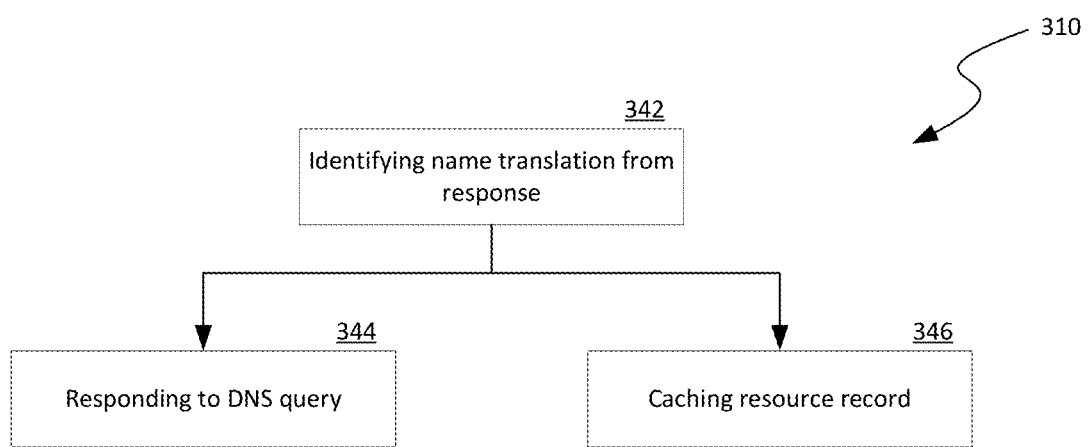

Referring back to FIG. 5A, in response to determining not to access passive nameserver(s), the process 300 can proceed to resolving the domain name at stage 310. FIG. 5E illustrates an example process 310 for resolving the domain name. As shown in FIG. 5E, the process 310 includes identifying name translations from the response from the active or passive nameserver at stage 342. The process 310 can also include responding to a DNS query at stage 344 from, for example, the client device 102 (FIG. 1) and/or caching the identified name translations as resource records at stage 346.

Figure 6A:
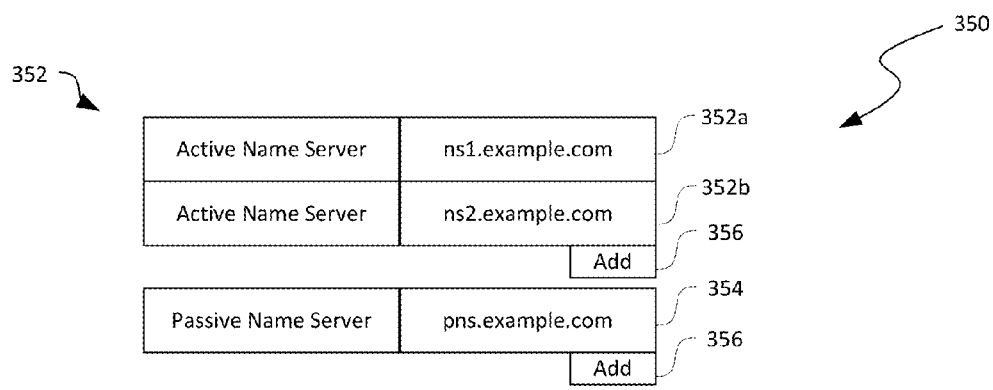
FIGS. 6A and 6B are example user interfaces useful for configuration of active/passive nameservers in accordance with embodiments of the disclosed technology.
Figure 6B:
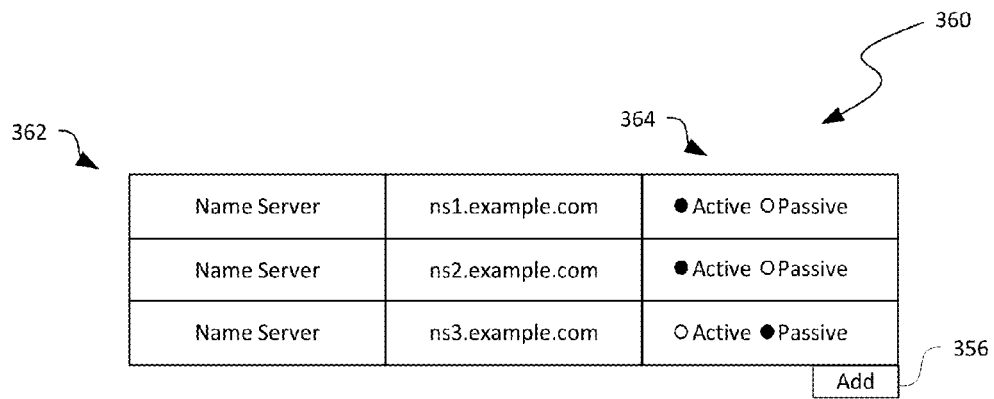

FIGS. 6A and 6B are example user interfaces 350 and 360, respectively, useful for configuration of active/passive nameservers in accordance with embodiments of the disclosed technology. As shown in FIG. 6A, the user interface 350 can include multiple entries 352 each configured to allow an administrator or other suitable entity to enter one or more URLs of active/passive nameservers. For example, the user interface 350 can include a first entry 352a configured to receive a URL of an active nameserver (i.e., "ns1.example.com") and a second entry 352b configured to receive another URL of an active name server (i.e., "ns2.example.com"). The user interface 350 can also include an entry 354 configured to receive a URL of a passive nameserver (i.e., "pns.example.com"). Even though particular entries 352 are shown in FIG. 6A, the number of entries 352 may be expanded by, for example, actuating "Add" buttons 356.

As shown in FIG. 6B, the user interface 360 can include multiple entries 362 configured to receive URLs of nameservers (e.g., "ns1.example.com," "ns2.example.com," and "ns3.example.com"). Each of the entries 362 can also include a designation field 364 configured to receive an indication whether the associated URL corresponds to an active or passive nameserver. For example, In the illustrated embodiment, selectable buttons are shown in the designation field 364 to indicate that "ns1.example.com" and "ns2.example.com" corresponds to active nameservers, and "ns2.example.com" corresponds to a passive nameserver. Similar to the user interface 350 of FIG. 6A, the number of entries 362 can also be expanded by actuating the "Add" button 356.

Figure 7:
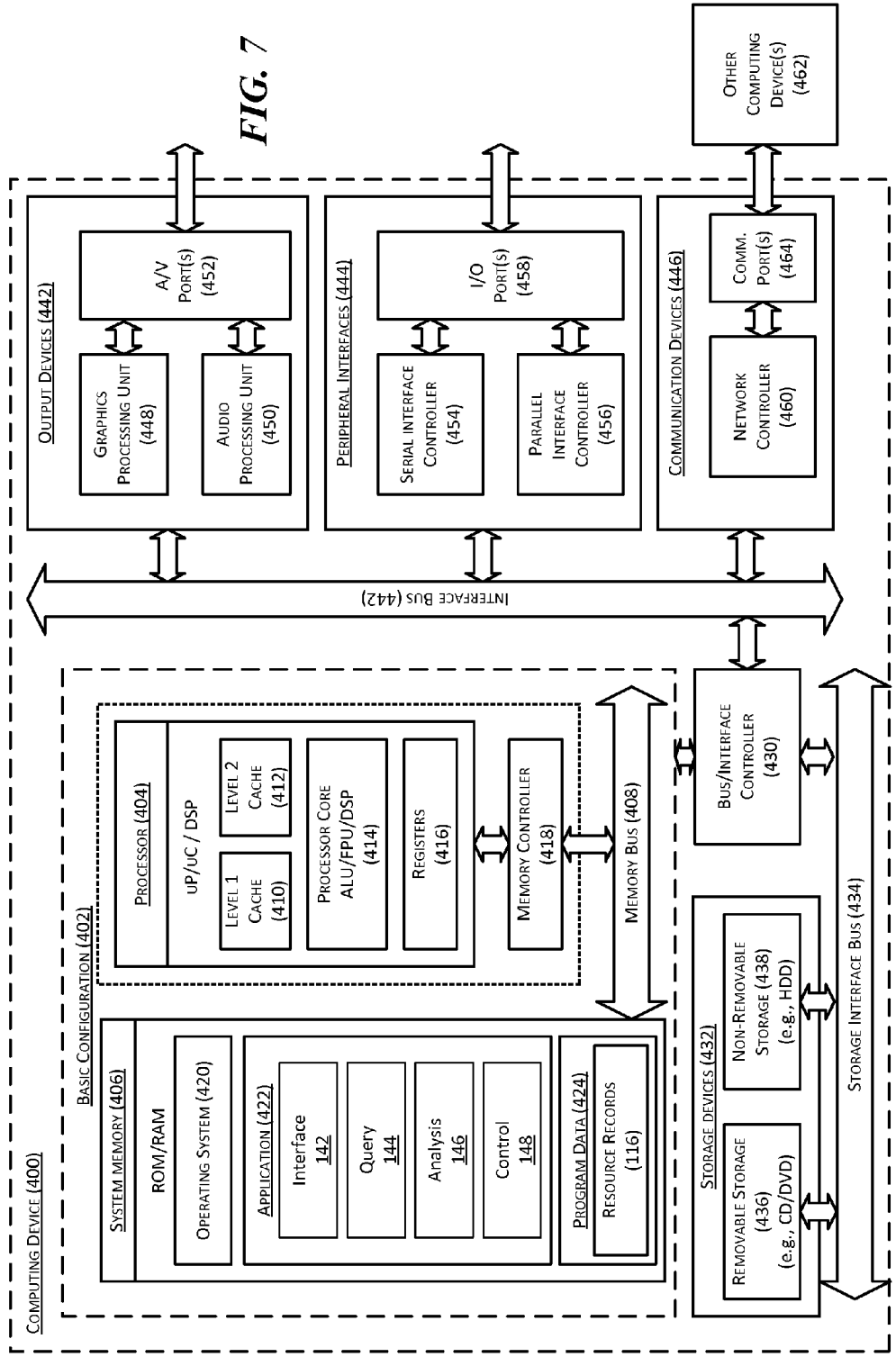
FIG. 7 is a computing device suitable for certain components of the computing frameworks in FIGS. 1-3B.

FIG. 7 is a computing device 400 suitable for certain components of the computing framework 100 in FIGS. 1-2B. For example, the computing device 400 may be suitable for the level-1 nameserver 136, level-2 nameserver 138, the client device 102, and the caching server 112 of FIG. 1. In a very basic configuration 402, computing device 400 typically includes one or more processors 404 and a system memory 406. A memory bus 408 may be used for communicating between processor 404 and system memory 406.

Depending on the desired configuration, the processor 404 may be of any type including but not limited to a microprocessor (μP), a microcontroller (μC), a digital signal processor (DSP), or any combination thereof. The processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, the system memory 406 may be of any type including but not limited to volatile memory (such as RAM), non-volatile memory (such as ROM, flash memory, etc.) or any combination thereof. The system memory 406 can include an operating system 420, one or more applications 422, and program data 424. As shown in FIG. 7, in certain embodiments, the application 422 may include, for example, the interface component 142, the query component 144, the analysis component 146, and the control component 148, as described in more detail above with reference to FIG. 3A. In other embodiments, the application 422 can also include other suitable components. The program data 424 may include, for example, the resource records 116. This described basic configuration 402 is illustrated in FIG. 9 by those components within the inner dashed line.

The computing device 400 may have additional features or functionality, and additional interfaces to facilitate communications between basic configuration 402 and any other devices and interfaces. For example, a bus/interface controller 430 may be used to facilitate communications between the basic configuration 402 and one or more data storage devices 432 via a storage interface bus 434. The data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 406, removable storage devices 436, and non-removable storage devices 438 are examples of computer readable storage media. Computer readable storage media include storage hardware or device(s), examples of which include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which may be used to store the desired information and which may be accessed by computing device 400. Any such computer readable storage media may be a part of computing device 400. The term "computer readable storage medium" excludes propagated signals and communication media.

The computing device 400 may also include an interface bus 440 for facilitating communication from various interface devices (e.g., output devices 442, peripheral interfaces 444, and communication devices 446) to the basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 400 may also be implemented as a personal computer including both laptop computer and non-laptop computer configurations.

Specific embodiments of the technology have been described above for purposes of illustration. However, various modifications may be made without deviating from the foregoing disclosure. In addition, many of the elements of one embodiment may be combined with other embodiments in addition to or in lieu of the elements of the other embodiments. Accordingly, the technology is not limited except as by the appended claims.

We claim:

1. A computing system for resolving domain names, comprising:
    an interface component configured to receive a nameserver record associated with a domain name, the nameserver record containing addresses of an active nameserver identified by a record type or a portion of the corresponding address and a passive nameserver identified by a different record type or a portion of the corresponding address, wherein:

the active nameserver is configured to provide name resolution of the domain name on a generally continuous basis; and the passive nameserver is configured to provide name resolution of the domain name only when no active nameserver associated with the domain name is reachable;

an analysis component configured to determine if the active nameserver identified in the received nameserver record is reachable by contacting the active nameserver based on the address of the active nameserver in the nameserver record; and a control component configured to direct the interface component to contact the passive nameserver for resolving the domain name based on the address of the passive nameserver in the nameserver record in response to a determination from the analysis component that (i) the active nameserver is unreachable and (ii) the nameserver record does not include an address of an additional active nameserver, and wherein the control component is configured to direct the interface component to continue contacting the active nameserver for resolving the domain name in response to subsequent requests for resolving the domain name without contacting the passive nameserver in response to a determination from the analysis component that the active nameserver is reachable.

2. The computing system of claim 1 wherein:
the active nameserver is a first level nameserver; and
the interface component is also configured to:
transmit a request to a second level nameserver for resolving the domain name, the second level nameserver containing the nameserver record; and
receive the nameserver record includes receiving the nameserver record from the second level nameserver generated in response to the transmitted request for resolving the domain name.

3. The computing system of claim 1 wherein:
the nameserver record includes addresses of additional active nameservers;
the analysis component is configured to, in response to determining that the active nameserver is unreachable, determine if any of the additional active nameservers is reachable; and
the control component is configured to direct the interface component to contact the passive nameserver for resolving the domain name based on the address of the passive nameserver in the nameserver record in response to determining that none of the additional active nameservers is reachable.

4. The computing system of claim 1 wherein:
the active nameserver is a first active nameserver;
the nameserver record also contains an address of a second active nameserver in addition to the first active nameserver; and
the control component is configured to direct the interface component to contact the second active nameserver for resolving the domain name without contacting the passive nameserver in response to that the first active nameserver is unreachable.

5. The computing system of claim 1 wherein:
the active nameserver is a first active nameserver;
the nameserver record also contains an address of a second active nameserver in addition to the first active nameserver; and in response to determining that the first active nameserver is reachable, the control component is configured to direct the interface component to:
selectively contact one of the first or second active nameservers in response to subsequent requests for resolving the domain name based on previous response times of the first and second active nameservers; and
not contact the passive nameserver for any of the subsequent requests for resolving the domain name.

6. A method for resolving domain names, comprising:
receiving a nameserver record associated with a domain name, the nameserver record containing addresses of an active nameserver identified by a record type or a portion of the corresponding address and a passive nameserver identified by a different record type or a portion of the corresponding address, wherein:
the active nameserver is configured to provide name resolution of the domain name on a generally continuous basis; and
the passive nameserver is configured to provide name resolution of the domain name only when no active nameserver associated with the domain name is reachable;
determining if the active nameserver identified in the received nameserver record is reachable by contacting the active nameserver based on the address of the active nameserver in the nameserver record; and
in response to determining that (i) the active nameserver is unreachable and (ii) the nameserver record does not include an address of an additional active nameserver, contacting the passive nameserver for resolving the domain name based on the address of the passive nameserver in the nameserver record; and
in response to determining that the active nameserver is reachable, continuing contacting the active nameserver for resolving the domain name in response to subsequent requests for resolving the domain name without contacting the passive nameserver.

7. The method of claim 6 wherein:
the active nameserver is a first level nameserver;
the method further includes transmitting a request to a second level nameserver for resolving the domain name, the second level nameserver containing the nameserver record; and
receiving the nameserver record includes receiving the nameserver record from the second level nameserver generated in response to the transmitted request for resolving the domain name.

8. The method of claim 6 wherein:
the nameserver record includes addresses of additional active nameservers;
in response to determining that the active nameserver is unreachable, determining if any of the additional active nameservers is reachable; and
in response to determining that none of the additional active nameservers is reachable, contacting the passive nameserver for resolving the domain name based on the address of the passive nameserver in the nameserver record.

9. The method of claim 6 wherein:
the active nameserver is a first active nameserver;
the nameserver record also contains an address of a second active nameserver in addition to the first active nameserver; and
the method further includes contacting the second active nameserver for resolving the domain name in response to determining that the first active nameserver is unreachable without contacting the passive nameserver.

10. The method of claim 6 wherein:

the active nameserver is a first active nameserver;

the nameserver record also contains an address of a second active nameserver in addition to the first active nameserver; and the method further includes in response to determining that the first active nameserver is reachable, selectively contacting one of the first or second active nameservers in response to subsequent requests for resolving the domain name based on previous response times of the first and second active nameservers; and not contacting the passive nameserver for any of the subsequent requests for resolving the domain name.

11. The method of claim 6 wherein:

the active nameserver is a first active nameserver;

the name record also contains an address of a second active nameserver in addition to the first active nameserver;

the method further includes:

contacting the second active nameserver for resolving the domain name in response to determining that the first active nameserver is unreachable;

determining if the second active nameserver is reachable; and in response to determining that the second active nameserver is unreachable, determining if the nameserver record contains an address of another active nameserver; and in response to determining that the nameserver record does not contain an address of another active nameserver, contacting the passive nameserver for resolving the domain name based on the address of the passive nameserver in the nameserver record.

12. The method of claim 6 wherein:

the passive nameserver is a first passive nameserver;

the nameserver record further contains an address of a second passive nameserver; and the method further includes only in response to determining that (i) the active nameserver is unreachable and (ii) the nameserver record does not include address of any additional active nameserver, selecting one of the first or second passive nameservers based on previous response times of the first and second passive nameservers; and contacting the selected first or second passive nameservers for resolving the domain name.

13. A method for resolving domain names, comprising:

transmitting domain name system ("DNS") queries to individual first nameservers included in a nameserver record associated with a domain name, the first nameservers being identified by a first record type, wherein the nameserver record also includes an address of a second nameserver identified by a second record type different than the first record type;

determining a number of the first nameservers of the first record type that are not responding to the transmitted DNS queries;

comparing the determined number of the first nameservers that are not responding to the transmitted DNS queries to a threshold; and in response to determining that the number of the first nameservers not responding to the transmitted DNS queries is above the threshold, contacting the second nameserver of the second record type for resolving the domain name based on the address of the second nameserver in the nameserver record; and in response to determining that the number of the first nameservers not responding to the transmitted DNS queries is not above the threshold, continuing contacting one of the first nameservers for resolving the domain name in response to subsequent requests for resolving the domain name without contacting the second nameserver.

14. The method of claim 13 wherein the threshold equals to a total number of the first nameservers.

15. The method of claim 13 wherein the threshold is less than a total number of the first nameservers.

16. The method of claim 13 wherein determining the number of the first nameservers that are not responding to the transmitted DNS queries includes determining a number of the first nameservers whose response times to the transmitted DNS queries exceed a response threshold or determining a number of the first nameservers from which no response is received after a predetermined number of retries.

17. The method of claim 13, further comprising:

monitoring the number of the first nameservers that are not responding to the transmitted DNS queries; and in response to determining that the number of the first nameservers not responding to the transmitted DNS queries is not above the threshold, terminating contacting the second nameserver for resolving the domain name based on the address of the second nameserver in the nameserver record.

18. The method of claim 13 wherein the first nameservers are configured to provide functionalities not implemented in the second nameserver.

* * * * *